US008869113B2

(12) United States Patent
Li et al.

(10) Patent No.: US 8,869,113 B2
(45) Date of Patent: Oct. 21, 2014

(54) SOFTWARE ARCHITECTURE FOR VALIDATING C++ PROGRAMS USING SYMBOLIC EXECUTION

(75) Inventors: Guodong Li, San Jose, CA (US); Sreeranga P. Rajan, Sunnyvale, CA (US); Indradeep Ghosh, Cupertino, CA (US)

(73) Assignee: Fujitsu Limited, Kawasaki-shi (JP)

( * ) Notice: Subject to any disclaimer, the term of this patent is extended or adjusted under 35 U.S.C. 154(b) by 635 days.

(21) Appl. No.: 13/010,714

(22) Filed: Jan. 20, 2011

(65) Prior Publication Data
US 2012/0192150 A1   Jul. 26, 2012

(51) Int. Cl.
*G06F 9/44* (2006.01)
*G06F 11/36* (2006.01)

(52) U.S. Cl.
CPC ........ *G06F 11/3684* (2013.01); *G06F 11/3604* (2013.01)
USPC ........... 717/124; 717/118; 717/127; 717/131; 717/140; 717/151

(58) Field of Classification Search
None
See application file for complete search history.

(56) References Cited

U.S. PATENT DOCUMENTS

| | | | |
|---|---|---|---|
| 5,325,530 A | 6/1994 | Mohrmann | |
| 5,367,685 A | 11/1994 | Gosling | |
| 5,511,198 A * | 4/1996 | Hotta | 717/156 |
| 6,766,511 B1 * | 7/2004 | Berry et al. | 717/128 |
| 6,918,106 B1 * | 7/2005 | Burridge et al. | 717/100 |
| 6,988,263 B1 * | 1/2006 | Hussain et al. | 717/128 |
| 7,171,655 B2 * | 1/2007 | Gordon et al. | 717/146 |
| 7,231,632 B2 | 6/2007 | Harper | |
| 7,441,110 B1 * | 10/2008 | Puzak et al. | 712/237 |
| 7,614,041 B2 | 11/2009 | Harper | |
| 7,624,449 B1 * | 11/2009 | Perriot | 726/24 |
| 7,665,062 B1 * | 2/2010 | Bauer et al. | 717/108 |
| 7,707,388 B2 | 4/2010 | Vishkin | |
| 7,945,898 B1 | 5/2011 | Episkopos | |
| 7,958,498 B1 | 6/2011 | Brown | |

(Continued)

OTHER PUBLICATIONS

Search Report for EP 12153888, Jun. 27, 2012.

(Continued)

*Primary Examiner* — Chameli Das
(74) *Attorney, Agent, or Firm* — Baker Botts L.L.P.

(57) ABSTRACT

Particular embodiment compile a C++ program having one or more input variables to obtain bytecode of the C++ program; compile a C++ library to obtain bytecode of the C++ library; symbolically execute the bytecode of the C++ program and the bytecode of the C++ library, comprising assign a symbolic input to each input variable of the C++ program; determine one or more execution paths in the C++ program; and for each execution path, construct a symbolic expression that if satisfied, causes the C++ program to proceed down the execution path; and generate one or more test cases for the C++ program by solving the symbolic expressions.

23 Claims, 3 Drawing Sheets

(56) References Cited

U.S. PATENT DOCUMENTS

| | | | |
|---|---|---|---|
| 2004/0015934 A1* | 1/2004 | Muthukumar et al. | 717/160 |
| 2004/0148475 A1* | 7/2004 | Ogasawara | 711/151 |
| 2004/0181713 A1* | 9/2004 | Lambert | 714/48 |
| 2005/0229044 A1* | 10/2005 | Ball | 714/38 |
| 2006/0023723 A1* | 2/2006 | Morara | 370/395.6 |
| 2007/0033576 A1* | 2/2007 | Tillmann et al. | 717/124 |
| 2007/0130403 A1* | 6/2007 | Bauer et al. | 710/71 |
| 2007/0150869 A1* | 6/2007 | Tateishi et al. | 717/127 |
| 2008/0010635 A1* | 1/2008 | O'Brien et al. | 717/160 |
| 2008/0256517 A1* | 10/2008 | Atkin et al. | 717/124 |
| 2009/0106737 A1* | 4/2009 | Chockler et al. | 717/126 |
| 2009/0113550 A1* | 4/2009 | Costa et al. | 726/25 |
| 2010/0125836 A1 | 5/2010 | Sazegari | |
| 2010/0313187 A1* | 12/2010 | Tan et al. | 717/131 |
| 2011/0078666 A1* | 3/2011 | Altekar | 717/131 |
| 2011/0289488 A1* | 11/2011 | Ghosh | 717/131 |
| 2011/0314454 A1* | 12/2011 | Godefroid et al. | 717/131 |
| 2012/0054552 A1* | 3/2012 | Artzi et al. | 714/38.1 |
| 2012/0065956 A1 | 3/2012 | Irturk | |
| 2012/0084759 A1* | 4/2012 | Candea et al. | 717/126 |
| 2012/0185731 A1 | 7/2012 | Barman | |
| 2012/0265490 A1* | 10/2012 | Kube et al. | 702/186 |
| 2013/0042123 A1 | 2/2013 | Smith | |

OTHER PUBLICATIONS

Cadar, C., et al., "KLEE: Unassisted and Automatic Generation of High-Coverage Tests for Complex Systems Programs," *OSDI '08 Proceedings of the 8th Usenix Conference on Operating Systems Design and Implementation*, pp. 209-224, Dec. 8, 2008, 2010.

Cui, H., et al., "Stable Deterministic Multithreading through Schedule Memoization," *Proceedings of the Ninth Symposium on Operating Systems Design and Implementation*, pp. 1-15, Oct. 2010.

Li, G., "A Short Tutorial of CKLEE for CUDA (Version 0.01)*," http://www.cs.utah.edu/formal_verification/mediawiki/images/e/e5/GKLEE_Tutorial, pp. 1-8, dated: Nov. 3, 2010.

Zamfir, C., et al., "Execution Synthesis: A Technique for Automated Software Debugging," *Proceedings of the 5th European Conference on Computer Systems, Eurosys '10*, pp. 321-334, Jan. 1, 2010.

U.S. Appl. No. 13/010,691, filed Jan. 20, 2011, Li.
U.S. Appl. No. 13/010,736, filed Jan. 20, 2011, Li.
U.S. Appl. No. 13/021,604, filed Feb. 4, 2011, Li.
Office Action for U.S. Appl. No. 13/021,604, Apr. 5, 2013.

* cited by examiner

SOFTWARE ARCHITECTURE FOR VALIDATING C++ PROGRAMS USING SYMBOLIC EXECUTION

TECHNICAL FIELD

This disclosure generally relates to testing and validating computer software and more specifically relates to testing and validating computer software written in C, C#, or C++ using symbolic execution and automatic test generation.

BACKGROUND

Validating or verifying computer software is a common concern among software developers and users. Whether a piece of software is, for example, a desktop application for installation and execution at one or more client computer systems or a web application for execution at one or more server computer systems, it is often important to carefully verify the quality of the software in order to ensure that it functions correctly. While some types of errors in software, such as bugs, cause annoyance or inconvenience to software users, other types of errors in software have the potential of causing more serious problems, possibly even resulting in significant financial losses to institutions.

Software testing is a common method of verifying the quality of software. With software testing, the software or one or more portions of the software under analysis is/are put through a suite of regression tests after each revision or modification and the outputs are evaluated for correctness. However, software testing often provides only limited coverage and has a tendency to miss corner-case bugs. Formal verification tends to address these problems. Formal verification mathematically proves the satisfiability of a specific requirement on the software under analysis or obtains a counter-example in the form of a test case that breaks the requirement and thus indicates a bug.

A software application may include any number of modules, and each module may be tested or validated individually or multiple modules may be tested or validated in combination. A software module may be tested or validated manually or automatically. In the former case, a person (e.g., a software testing engineer) may manually design test cases for the software module based on the design specification of the module, execute the module under the test cases, and check for module behavior or output that does not agree with the test cases. In the later case, a software testing tool, implemented as computer software or hardware, may automatically generate test cases for a software module under analysis, execute the module while simulating the test cases, and check for module behavior or output that does not agree with the test cases.

DESCRIPTION OF EXAMPLE EMBODIMENTS

Figure 1:
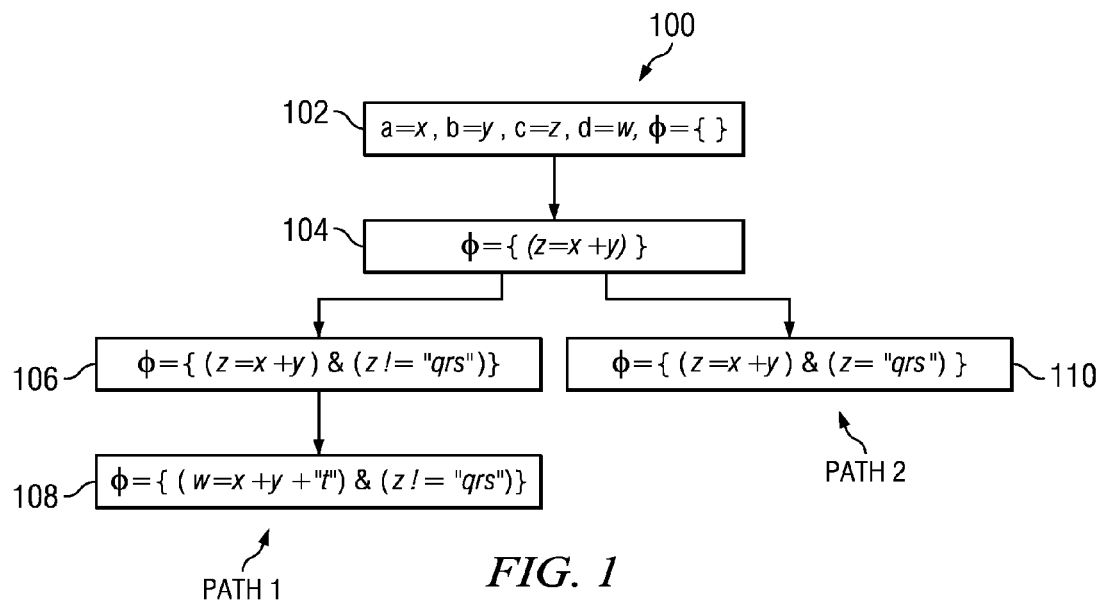
FIG. 1 illustrates an example execution flow representing the steps of performing symbolic execution on an example software module.

Particular embodiments provide symbolic execution and automatic test generation for computer software written in C, C#, or C++. More specifically, particular embodiments provide a symbolic execution and automatic test generation tool for formally validating computer software written in C, C#, or C++. In particular embodiments, a C, C#, or C++ program (e.g., a software application or module) is complied into Low Level Virtual Machine (LLVM) bytecode, and then dynamically linked to a light-weight C or C++ library to symbolically execute the program. In particular embodiments, low level libraries (e.g., the POSIX C library and the C++ library) are implemented to avoid superfluous paths and support in-house solving. In particular embodiments, efficient solvers for commonly used data structures, such as string, integer, or vector, are provided to reduce processing time. In particular embodiments, specific handlers are used to optimize the processing of domain-specific operations, such as database access. In particular embodiments, the symbolic execution and automatic test generation tool supports data structures with symbolic lengths, and is able to automatically generate test cases with high coverage guarantee and reveal bugs in the C, C#, or C++ program omitted by traditional testing tools.

A software application is often organized into a number of software modules, and each software module may include code that perform specific functionalities. In a typical scenario, a software module may have any number of input or output variables. When the software module is invoked, actual input values may be passed to the software module (e.g., by the code that has invoked the software module) as the values assigned to the input variables of the software module. The code of the software module may be executed in connection with the actual input values. Eventually, actual output values for the output variables of the software module may be determined and returned by the software module (e.g., to the code that has invoked the software module), at which point the software module completes its execution. Moreover, the actual output values determined by the code of the software module usually depend on the actual input values passed to the software module upon its invocation. In addition, the software module may have any number of local variables, also referred to as intermediate variables, whose values may also depend, directly or indirectly, on the values of the input variables. A local variable has a local scope. It only exists and is only accessible from within the context of the software module in which the local variable is declared. In contrast, the software application, to which the software module belongs, may have any number of global variables. A global variable has a global scope within the software application itself and is accessible to all the software modules that belong to the software application. When a software module is invoked, it may access or modify the value of a global variable, and the value modification is persistent even after the software module completes its execution.

In particular embodiments, when the value of a first variable is determined based on the value of a second variable (i.e., the value of the first variable depends on the value of the second variable), the first variable is considered to depend on the second variable. A variable, whether input or output and whether local or global, usually has a specific data type, such as, for example and without limitation, character, string, integer, float, double, Boolean, pointer, array, and enumeration. The data type of a variable indicates what type of data (e.g., actual values) may be assigned to the variable. For example, only integer values should be assigned to a variable whose type is integer; and only true-false values should be assigned to a variable whose type is Boolean. Different programming languages may define different data types that the variables of the software modules or applications written in the specific languages may have, as well as different operations that may be applied to the specific data types.

A software application may be formally tested and validated. In particular embodiments, to formally test and validate a software application, the individual modules included in the software application are formally tested and validated. In particular embodiments, a software module may be formally tested and validated using symbolic execution. More specifically, particular embodiments may use symbolic execution to automatically generate test input values to be used for testing the software module. These test input values may be assigned to the input variables of the software module under analysis when the software module is invoked for testing purposes, and the output values resulted from the software module based on these test input values may be analyzed to determine the behavior of the software module and formally validate the software module.

In the filed of computer science, symbolic execution refers to the analysis of software programs by tracking symbolic rather than actual values, as a case of abstract interpretation. It is a non-explicit state model-checking technique that treats input to software as symbol variables. It creates complex equations by executing all finite paths in the software with symbolic variables and then solves the complex equations with a solver (typically known as a decision procedure) to obtain error scenarios, if any. In contrast to explicit state model checking, symbolic execution is able to work out all possible input values and all possible use cases of all possible input values in the software under analysis. Thus, symbolic execution can exhaustively validate software under analysis.

To further explain symbolic execution, consider an example software module (e.g., a method written in C++) named "foo":

```
1     string foo (string a, string b) {
2         string c, d;
3         c = a + b;
4         if (c != "qrs") {
5             d = c + "t";
6             return d;
7         } else {
8             return c;
9         }
10    }
```

Sample Code

Software module "foo" has two input variables "a" and "b" and two local variables "c" and "d". In particular embodiments, the value of a local variable may depend, directly or indirectly, on the value of one or more input variables of the software module. For example, with module "foo", the value of local variable "c" depends directly on the values of input variables "a" and "b", as indicated by line 3 of the code; and the value of local variable "d" depends indirectly on the values of input variables "a" and "b", through local variable "c", as indicated by line 5 of the code. In addition, module "foo" contains a conditional branching point at line 4 of the code, caused by the "if-else" statement. The conditional branching point at line 4 is associated with a branching condition "(c !="qrs")". Depending on whether this branching condition is satisfied or holds true—that is, whether local variable "c" equals "qrs"—module "foo" proceeds down different execution paths and different portions of the code of module "foo" is actually executed. More specifically, if local variable "c" does not equal "qrs", then the value of local variable "d" is computed and returned, as indicated by lines 5 and 6 of the code. On the other hand, if local variable "c" does equal "qrs", then the value of local variable "c" is returned, as indicated by line 8 of the code.

When symbolic execution is performed on module "foo", its input and local variables are each assigned a symbolic value instead of an actual value. FIG. 1 illustrates an example execution flow 100 representing the steps of performing symbolic execution on module "foo". In this example, input variable "a" is assigned symbolic value "x"; input variable "b" is assigned symbolic value "y"; local variable "c" is assigned symbolic value "z"; and local variable "d" is assigned symbolic value "w". Since variables "a", "b", "c", and "d" are of type "string", symbolic values "x", "y", "z", and "w" each represent an arbitrary string.

In addition, "Φ" is the symbolic expression that represents the result of the symbolic execution at various points along the execution paths. More specifically, at 102, which corresponds to line 2 of the code of module "foo", variables "a", "b", "c", and "d" are assigned their respective symbolic values "x", "y", "z", and "w", and "Φ" initially has an empty or null expression. As the execution proceeds further, expressions are added to "Φ" depending on what code has been executed. At 104, which corresponds to line 3 of the code of module "foo", "Φ" has the expression "z=x+y" because line 3 of the code is "c=a+b" and "x", "y", and "z" are the symbolic value assigned to variable "a", "b", and "c", respectively. Next, line 4 of the code of module "foo" is a conditional branching point and there are two possible execution paths down which the execution may proceed. Thus, the symbolic execution may also proceed down two different paths from 104: the first path, PATH 1, includes 106 and 108 corresponding to lines 5 and 6 of the code; and the second path, PATH 2, includes 110 corresponding to line 8 of the code.

In order to proceed down PATH 1, variable "c" does not equal "qrs", which means symbolic value "z" does not equal "qrs". Therefore, the expression "z !="qrs"" is added to "Φ" at 106. Conversely, in order to proceed down PATH 2, variable "c" does equal "qrs", which means symbolic value "z" equals "qrs". Therefore, the expression "z="qrs"" is added to "Φ" at 110. Along PATH 1, the value of variable "d" is determined at line 5 of the code, which corresponds to 108. Therefore, the expression "w=z+"t"" is added to "Φ" at 108. Note that because "z=x+y", the expression for "w" may be rewritten as "w=x+y+"t"". 108 is the end of PATH 1, and thus, the expression of "Φ" at 108 represents the conditions, in symbolic form, that need to be satisfied in order to reach the end of execution PATH 1. Similarly, 110 is the end of execution PATH 2, and thus, expression of "Φ" at 110 represents the conditions, in symbolic form, that need to be satisfied in order to reach the end of PATH 2.

Since module "foo" has two possible execution paths, symbolically executing module "foo" results in two sets of expressions, one corresponding to each execution path. In particular embodiments, solving for the expression of "Φ" at 108 may provide the actual values for input variables "a" and "b" that cause module "foo" to reach the end of PATH 1; and solving for the expression of "Φ" at 110 may provide the actual values for input variables "a" and "b" that cause module "foo" to reach the end of PATH 2.

In particular embodiments, the expressions obtained from symbolically executing a software module (e.g., "Φ" at 108 and 110 in FIG. 1) may be solved using a solver. For example, a solver for solving symbolic expressions may be implemented based in part on the Satisfiability Modulo Theories (SMT). In particular embodiments, a SMT solver may take as input a symbolic expression, which may include any number of constraints that need to be satisfied in order to proceed down a specific path in the software module, and attempt to find one or more solutions that satisfy all the constraints from the symbolic expression. If any solution may be found, the SMT solver may provide the solution as its output. Of course, it is possible that a symbolic expression may not have any solution that satisfy all the constraints in the expression, in which case the expression is considered unsatisfiable or unsolvable. In particular embodiments, the outputs from the SMT solver may be used as test cases for formally testing and validating the software module.

For example, in FIG. 1, "Φ" at 108 is the expression for PATH 1 ("Φ={(w=x+y+"t") & (z !="qrs")}"). The solutions obtained from solving this expression may be used as test cases for testing module "foo" along PATH 1. Similarly, "Φ" at 110 is the expression for PATH 2 ("Φ={(z=x+y) & (z="qrs")}"). The solutions obtained from solving this expression may be used as test cases for testing module "foo" along PATH 2.

As the above example illustrates, symbolic execution is a software program or software module analysis technique that starts the execution of a software program or module on symbolic, rather than concrete inputs, and it computes the effect on the software program or module on these symbolic inputs using symbolic expressions (e.g., the symbolic expressions represented by "Φ" in FIG. 1). Symbolic execution characterizes each path in a software module it explores with a path condition defined as a conjunction of Boolean expressions. Each Boolean expression denotes one branching decision made during the execution of a distinct path of the program or module under test (e.g., PATH 1 and PATH 2 illustrated in FIG. 1). When the execution is finished, multiple path conditions may be generated, each corresponding to a feasible execution path of the code in the software module with respect to the symbolic input. The solutions to these conditions are the test inputs. In addition, during symbolic execution some sanity properties may be checked, such as memory out-of-bound access, divide-by-zero, and user-defined assertions. Symbolic execution thus has the advantage of achieving much more coverage of program behaviors than traditional testing approaches.

Currently, there exit no symbolic execution tools for computer software written in C++, which is a statistically typed, free-form, multi-paradigm, complied, general-purpose programming language. Existing symbolic execution tools, such those suitable for computer software written in C, are inefficient due to the lack of good abstractions of library Application Programming Interfaces (APIs), fast solvers for commonly used data structures, domain specific handlers, and so on. To address these problems, particular embodiments provide a symbolic execution and automatic test generation tool, especially suitable for software written in C, C#, or C++, that includes customized implementations of low level libraries (e.g., the POSIX C library and the C++ library) to avoid superfluous symbolic paths and improve solver performance, uses an intermediate language (IL) to model a set of application-specific (AS) operations, and compiles the C, C#, or C++ program under analysis and C++ library to LLVM bytecode.

Figure 2:
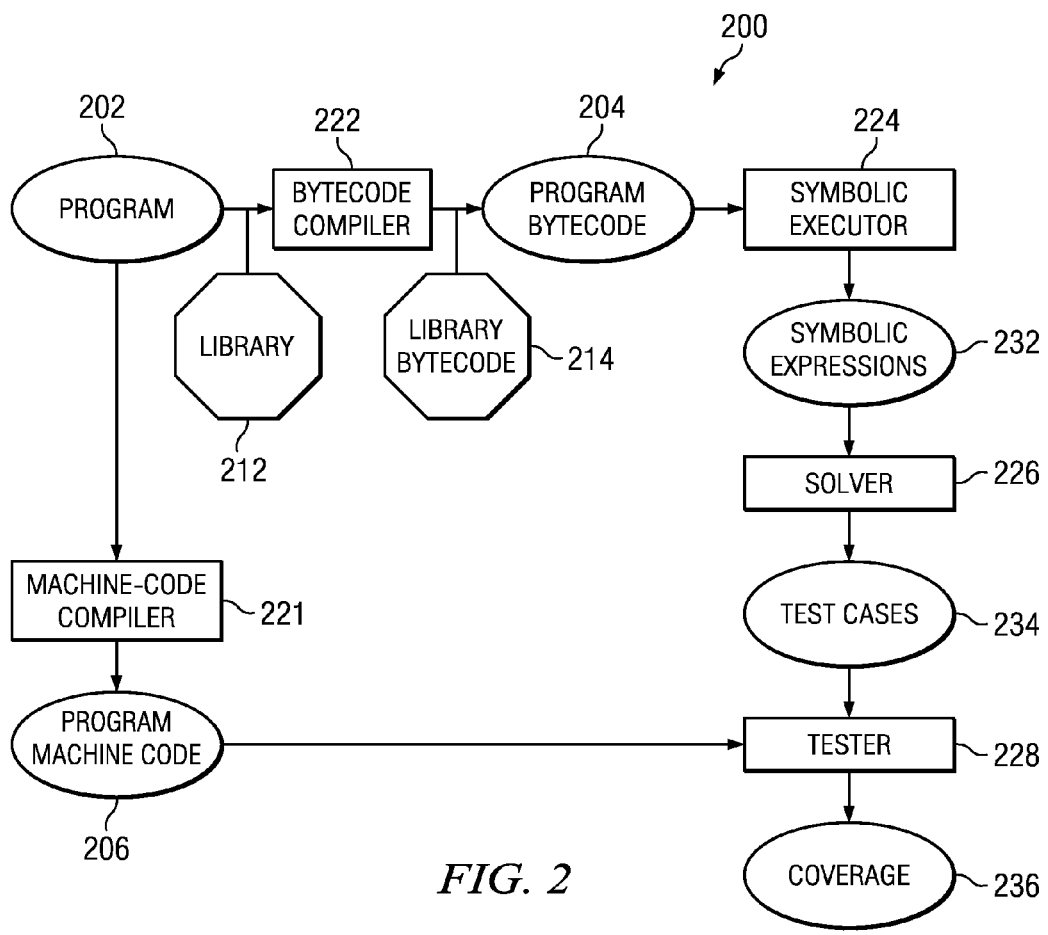
FIG. 2 illustrates an example software architecture for validating software programs using symbolic execution.
Figure 3:
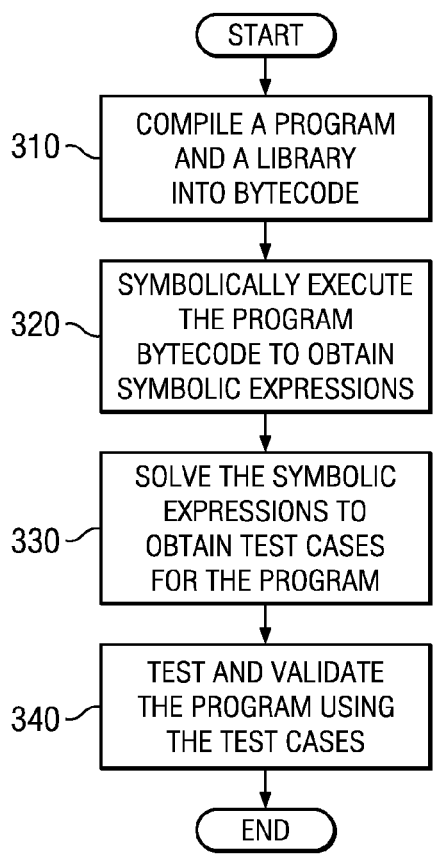
FIG. 3 illustrates an example method for validating software programs using symbolic execution.

FIG. 2 illustrates an example system 200 for validating software programs using symbolic execution. FIG. 3 illustrates an example method for validating software programs using symbolic execution. FIGS. 2 and 3 are described in connection with each other. In particular embodiments, system 200 may be suitable for validating software programs written in C, C#, C++, or any other programming language where the source code may be complied into bytecode (e.g., programs written in Java). Bytecode is a form of instruction sets designed for efficient execution by a software interpreter and is suitable for further compilation into machine code. In particular embodiments, a software program may be a complete software application that includes any number of software modules or a single software module (e.g., an object, a function, a procedure, or a method). In particular embodiments, system 200 may include a machine-code compiler 221, a bytecode compiler 222, a symbolic executor 224, a solver 226, and a tester 228, and they each may perform some of the steps described in FIG. 3. In particular embodiments, machine-code compiler 221, bytecode compiler 222, symbolic executor 224, solver 226, and tester 228 may each be a software component, a hardware component, or a combination of two or more such components.

Suppose a program 102 is to be analyzed (e.g., formally validated using symbolic execution). As an example, further suppose that program 102 is written in C++. Program 102 may have one or more input variables. In particular embodiments, each input variable may be assigned a symbolic value. Thus, program 102 has symbolic inputs.

Typically a C or C++ program may require one or more runtime libraries when being compiled or executed. For example, these libraries may include the C library or the C++ library provided by a C or C++ compiler, In addition, there may be one or more user libraries. In particular embodiments, these libraries may be dynamically linked to the C or C++ program at runtime. Suppose a library 212 includes the necessary libraries required by program 202, which may include the C library, the C++ library, and any user library.

In particular embodiments, program 202 and library 212 may be compiled by bytecode compiler 222 to generate program bytecode 204 for program 202 and library bytecode 214 for library 212, as illustrated in STEP 310. In particular embodiments, compiler bytecode 222 may be any suitable C++ compiler that is capable of compiling the source code of a C++ program into bytecode. For example, bytecode compiler 222 may be a LLVM compiler (e.g., LLVM-G++ compiler), in which case program bytecode 204 and library bytecode 214 are LLVM bytecode.

In particular embodiments, program bytecode 204 and library bytecode 214 may be symbolically executed by symbolic executor 224, as illustrated in STEP 320. As described above in connection with FIG. 1, through symbolic execution, the possible execution paths in a software module caused by conditional branches in the source code (e.g., a "if-else" statement) may be individually analyzed, and a symbolic expression may be obtained for each path.

The C++ programming language is an object based language (objected oriented programming language). It has unique features, such as classes, that are not available with the C programming language. When a C++ program is complied into bytecode, it also has unique features not available with bytecode obtained from compiling, for example, a C program. Thus, in order to symbolically execute the bytecode resulted from compiling a C++ program, the symbolic executor used needs to be able to handle these unique features from the C++ programming language. In particular embodiments, symbolic executor 224 is capable of handling all C++ features as well as features from C, C#, or another other applicable programming language.

In particular embodiments, when symbolically executing the bytecode of a program, a symbolic state is used to model a machine execution state. In particular embodiments, a register stores a concrete value or a symbolic expression. In particular embodiments, mimicking the machine stack, a symbolic stack consists of multiple frames. In particular embodiments, a memory is organized as components, each of which has a concrete address and an array of bytes recording the value. In particular embodiments, the fields of a C++ object are allocated consecutive memory blocks. For example, suppose that the addresses of the two fields of an object are $m_{1,1}$ and $m_{1,2}$ respectively, and the relation $m_{1,2}=m_{1,1}+size(fd_{1,1})$ holds. On the other hand, the memory blocks of different objects do not have to be consecutive, which can support automatic resizing (described in more detail below). The following example illustrates the memory block allocations for two objects, each having a number of fields:

| object 1 | | ... | object 2 | ... |
|---|---|---|---|---|
| $(m_{1,1}, fd_{1,1})$ | $(m_{1,2}, fd_{1,2})$ | ... ... | $(m_{2,1}, fd_{2,1})$ | ... ... |

Sample Memory Block Allocation

To support object-level reasoning (described in more detail below), in particular embodiments, an entire object may be represented by a single symbolic expression whose width is equal to the size of the object. Width checking is an important approach to ensure a symbolic executor's (e.g., symbolic executor 224) sanity. In particular embodiments, if a pointer can refer to multiple components, a new state is generated for each possible reference decided by a solver (e.g., solver 226) when solving the symbolic expressions. Although this method may be expensive for pointers with large points-to sets, typical programs only use symbolic pointers that refer to a single component, and there may be optimization for this case.

Figure 4A:
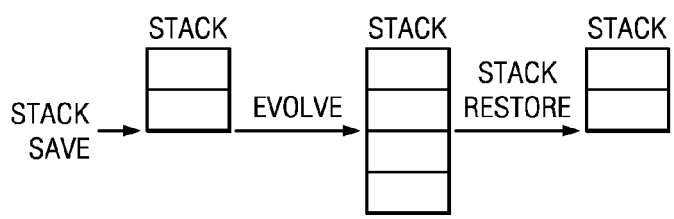
FIG. 4A illustrates an example of stack function.
Figure 4B:
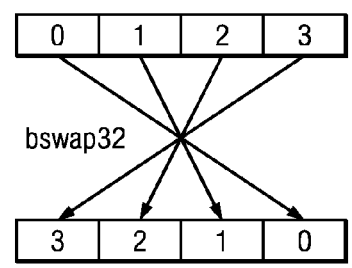
FIG. 4B illustrates an example of byte swapping.

In particular embodiments, symbolic executor 224 interprets program bytecode 204 and library bytecode 214. In particular embodiments, most C++ features such as polymorphism and templates are handled by bytecode compiler 222 (e.g., LLVM-GCC compiler). However, since C++ programs are far more complicated than C programs, this may introduce extra LLVM instructions (mainly LLVM intrinsic functions) that need to be handled by symbolic executor 224. In particular embodiments, symbolic executor 224 may implement some advanced instructions in order to handle these extra LLVM instructions. In practice, there may be more than fifteen such advanced instructions. For example, the llvm.stacksave intrinsic is used to remember the current state of the function stack, which is to be restored by llvm.stackrestore, as illustrated in FIG. 4A As another example, the three llvm.bswap instructions byte swap integer values with an even number of bytes, as illustrated in FIG. 4B. Symbolic executor 224 may implement these instruction, and the implementation of these instructions follows their semantics.

The C++ programming language provides built-in support for raising and handling exceptions. The eight llvm.eh instructions along with external exception calls need to be interpreted in the right exception semantics (e.g. exception handling in C++ propagates the exceptions up the stack). In particular embodiments, a specific data structure is used by symbolic executor 224 to represent exceptions. Symbolic executor 224 builds the exception table and interprets the exception instructions according to their semantics. In practice, there may be approximately ten such exceptions.

In particular embodiments, symbolic executor 224 uses a C++ memory model, which involves many atomic operations and synchronization intrinsics. For example, llvm.memory.barrier guarantees ordering between specific pairs of memory access types, and llvm.atomic.load.add performs the add and store atomically. In particular embodiments, with symbolic executor 224, these intrinsics are implemented by serializing the operations. For example, atomic.cmp.swap is implemented by a compare operation followed by a swap operation; and atomic.load.max is by a load followed by the max function. In particular embodiments, no interfering from other instructions is allowed between the two operations. In practice, there may be approximately thirteen instructions involved with the C++ memory model.

In particular embodiments, symbolic executor 224 supports floating point numbers. In practices, there may be more than thirty instructions and intrinsics for manipulating floating numbers. Particular embodiments extend the intermediate representation and use more advanced SMT solvers (e.g., as a part of solver 226) to support floating point numbers.

In particular embodiments, each symbolic expression may be solved using solver 226 to obtain one or more test cases 234, as illustrated in STEP 330. In particular embodiments, solver 226 may be a SMT solver, which take symbolic expressions as input and provide test cases as output. In addition, in particular embodiments, symbolic execution may also provide statistics information such as bytecode coverage and sanity and functional correctness.

In particular embodiments, test cases may then be used to formally test and validate program 202 using, for example, tester 228, as illustrated in STEP 340. For example, program 202 may be complied into machine code 206 using machine-code compiler 221 and executed on a computing device in a real-life setting (e.g., a setting that is similar to the environment in which the program is intended to be execute) while applying test cases 234 to determine coverage information about program 202 using, for example, tools such as gcov or lcov. If there is any error (e.g., program bugs) in the source code of program 202, it may be discovered through the testing process. In particular embodiments, machine-code compiler 221 may be any suitable C++ compiler (e.g., gcc) that is able to compile a C++ program into executable machine code. Machine-code compiler 221 may provides a C library or C++ library, already compiled into machine code, which may be dynamically linked to program machine code 206 at runtime.

In order to further improve system 200, particular embodiments may implement a number of optimizations for system 200. These optimizations, in some cases, scale up the performance of system 200.

First, particular embodiments may optimize the C++ library (e.g., library 212) used with system 200. The C++ standard includes a library for all commonly used data structures and algorithms. Instead of using the standard C++ library coming with a compiler (e.g., the GCC compiler), particular embodiments choose and optimize the uClibc++ library so as to improve the performance of symbolic execution. In this case, library 212 in system 200 is the optimized C++ library. Particular embodiments compile this optimized library into LLVM bytecode (e.g., library bytecode 214) and load it into the engine at the beginning of symbolic execution. Particular embodiments maintain two versions of the C++ library: one for symbolic execution, the other one for handling concrete values and the Just-In-Time compilation of external functions such as system APIs. When the expression contains no symbolic variable or an external function is to be made, the standard uClibc++ library is used; otherwise the one optimized for symbolic execution is used.

The C++ standard comes with a standard library defining over forty classes. Unfortunately they are designed for concrete execution. Efficient symbolic execution may require particular embodiments to rewrite some or all the C and C++ class implementation to cater for the need of symbolic execution such as (1) unnecessary conditional statements should be avoided to reduce the number of generated paths; (2) expensive expressions should be converted into cheaper ones (e.g. multiplications are replaced by bit operations); and (3) fast decision procedures shall be built into the library implementation. In particular embodiments, library 212 used system 200 contains a number of commonly-used classes highly optimized for symbolic execution.

As described above in connection with FIG. 1, with symbolic execution, the individual execution paths in the source code of a software module is analyzed. A branching or forking of the execution path occurs when there is a conditional branching statement, such as an "if-else" statement. Typically, when the branching conditions are satisfied, the program proceeds down one execution path, and when the branching conditions are not satisfied, the program proceeds down another execution path. Each execution path results in a symbolic expression at the end. The more execution paths there are in a software module, the more symbolic expressions result from symbolic execution. If there is a branching condition inside, for example, a loop, then for every iteration of the loop, there is a branching or forking of the execution path. In such cases, there may be an exponential blow-up in the number of execution paths resulting from the repeated branching occurring at every iteration of the loop, and this in turn may result in a very large number of symbolic expressions. The symbolic expressions will themselves grow in size exponentially, which will render them difficult to solve by a solver.

Particular embodiments may modify the source code of the standard C++ library functions to move branching conditions outside of loops while maintaining the same functionalities of these library functions. This way, having a loop with many iterations does not result in many execution paths. More specifically, particular embodiments modify the body of a library function and return an expression. This optimization may be considered as an operational approach since the body of the function is still executed directly. For example, the compare method of the String class in the uClibc++ library may be modified as follows. The modified compare method produces only one execution path regardless of the values of the two input strings (of concrete lengths), because there is no conditional branching inside the "for" loop.

```
__UCXXEXPORT int compare(const basic_string& str) const {
    size_type rlen = vector<Ch, A>::elements;
    if (rlen > str.elements) rlen = str.elements;
    int v = 0;
    // 1, 0 and -1 stand for gt, eq and lt respectively
    for (size_type i = 0; i < rlen; i++)
        v += (~(!v)+1) & ((operator[ ](i)>str[i]) -
            (operator[ ](i)<str[i]));
    v += (~(!v)+1) & ((vector<Ch, A>::elements > str.elements)
        - (vector<Ch, A>::elements < str.elements));
    return v;
}
```

Sample Code for Optimized String.compare( )

Particular embodiments may provide some hack-in functions to access symbolic executor 224. For example, function is_symbolic tells whether a variable's value is symbolic, and function make_ite asks symbolic executor 224 to create an if-then-else expression so as to avoid creating two paths. The library optimization uses these functions to interact with symbolic executor 224.

The operational method may build up a very complicated symbolic expression as the return value. To avoid this, particular embodiments may develop another method, which adds constraints into the current state rather than executes all the code. This optimization may be considered a relational approach. For a function, symbolic executor 224 is informed to create a symbolic variable Vr representing the return value and then relate this variable with the inputs of the function using logical formulas. For example, the find_last_of method of the String class is illustrated below. Function assume indicates to symbolic executor 224 to put the constraint into the path condition. This implementation produces only one execution path even when the return value can be −1 or any position within the input string. In fact, such definitions implement a decision procedure (e.g., for the String class) in the source code. In particular embodiments, building solvers (e.g., as a partial replacement of standalone solver 226) through source code definitions is a core feature of system 200. This avoids the complexity of implementing such external solvers.

```
find_last_of (const char c) {
    size_type rlen = vector<Ch, A>::elements;
    assume(Vr >= -1 && Vr < rlen);
    assume(Vr == -1 || operator[ ](Vr) == c);
    for (size_type i = 0; i != rlen ; i++)
        assume(i <= Vr || operator[ ](i) != c);
}
```

Sample Code for Optimized String.find_last_of( )

The following example illustrates how the optimized library implementation results in a fast solver for strings, replacing part of the functionality of external solver 226:

```
1    int k = str.find_last_of('/');
2    string rest = str.substr(k + 1);
3    if (rest.find("EasyChair") != string::npos)
4    ...
```

Sample Code for Using String.find_last_of( )

In this example, the String.find_last_of( ) function is used as a specific illustration. In particular embodiments, upon visiting the first statement at line 1, symbolic executor 224 adds the constraints shown above into the path condition, where Vr is replaced a fresh variable $i_1$ ("i" represents an integer). This variable is written into the destination register and then propagated along the execution. Thus, the k variable in the above source code is replaced with $i_1$. Similarly, the second statement at line 2 is executed, leading to a fresh string variable $s_1$, replacing the rest variable. At line 3, the find method results in another integer variable $i_2$. Then, the path condition contains the conjunction of all constraints relevant to find_last_of, substr and find. The conditional statement $i_2$ !=npos along with the path condition containing all the constraints is dumped to SMT solver 226 to obtain a test case on the input string str for one execution branch. Similarly, the condition $i_2$=npos along with the path condition containing all the constraints is dumped to SMT solver 226 to obtain a second test case on the input string str for the other branch. In other words, particular embodiments implement a string solver by purely modifying the source code. It does not require modifying the executor's (e.g., symbolic executor 224) intermediate language or linking in external solvers. It is highly extensible since the source C++ code is easy to modify. Furthermore, the correctness of the code can be checked directly using symbolic execution. This technique may be similarly extended to handle other C or C++ library classes.

One of the main features of the C++ programming language is class and object. Particular embodiments extend the intermediate language (IL) used by system 200 to model C++ classes and objects directly. During symbolic execution, the symbolic expressions may contain symbolic variables representing the objects and the names of method calls on these objects. In particular embodiments, a method call is not immediately expanded to its implementation when it is first encountered. Instead, a "lazy evaluation" approach is adopted to delay the evaluation of objects and methods until they are needed. This also helps the simplification and reasoning on the objects. For example, the following piece of sample code involves the String class.

```
1    int k = str.find_last_of('/');
2    string rest = str.substr(k + 1);
3    if (rest == "EasyChair")
4    ...
```

Sample Code for Using the String Class

Upon encountering the branching condition at line 3, the expression str.substr(str.find_last_of('/')+1)="EasyChair" is built, which may be simplified with respect to the semantics of these string operations) to str=s1+"/EasyChair" for a free string variable $s_1$. Particular embodiments build in such simplifications and decision procedures (described in more detail below) for common classes. Note that, particular embodiments may simply use the library definitions of the methods to interpret this expression—now the interpretation is delayed to the condition point. For particular embodiments, extending the intermediate language for object level abstractions may be crucial for the symbolic execution of object-oriented programming languages such as C++.

To further improve the performance of object-level reasoning, particular embodiments implement specific solvers (e.g., included in solver 226) for some common data structures. For example, particular embodiments may implement a string solver based on SMT solving, which may be incorporated seamlessly in symbolic executor 224. Consider the example illustrated above, particular embodiments may implement a string solver that creates the following expression constraining the values and lengths of the string variables, whose lengths are not fixed:

$$\wedge (k = -1 \wedge \forall i \in [0, \text{len}(str)) : str[i] \neq \text{'/'} \vee k \geq 0 \wedge str[k] = \text{'/'} \wedge \forall i \in (k, \text{len}(str)) : str[i] \neq \text{'/'})$$
$$\wedge \text{rest} = str[k + 1, \text{len}(str) - 1] \wedge \text{len}(rest) = \text{len}(str) - k - 1$$
$$\wedge \text{rest} = \text{"EasyChair"} \wedge \text{len}(rest) = 9$$

Sample Symbolic Expression

In this example, the constraints on the lengths are first extracted and dumped to solver 226 to get a minimal instance of each length, and then the length of each string is set, and the constraints on the strings are built and dumped to solver 226 to obtain a satisfiable case. With such built-in solvers incorporated in solver 226, particular embodiments only improve the performance of system 200, but also loose constraints on the inputs (e.g., having variable lengths).

Sometimes, when a symbolic expression e becomes very complicated, a regular SMT solver may take too much time to respond. For such cases, in particular embodiments, the users may choose to concretize e's value. In particular embodiments, solver 226 may give a possible value or a small set of values for each involved symbolic variable such that e is satisfiable. Then, this knowledge is added into the path condition by replacing the involved variables with their concrete values.

In practice, a software validation system usually generates more than 10,000 test cases so as to obtain high coverage even for small C programs. In particular embodiments, system 200 may also suffer from this problem when the program being analyzed has loops whose bodies contain many branches. In particular embodiments, the effort to minimize the number of test cases is essential to make a software validation system, such as system 200, usable and friendly to the users, especially for industrial applications. Thus, particular embodiments develop some path reduction mechanisms to avoid visiting the blocks or branches that do not lead to new coverage. In particular embodiments, the first approach is based on a reachability analysis. More specifically, when a branch is encountered, particular embodiments check whether it will lead to some unvisited corner instructions by chasing the subsequent control flows. The corner instructions include branch instructions, procedure call instructions, or those specified by the users. To bound the chasing, limits are set on chasing over procedures. Although this approach may miss some (e.g., tricky) branches, it is effective in reducing around approximately 90% duplicate paths without sacrificing the coverage for unit testing where a lot of redundancy exist in the diver. Particular embodiments may also develop a lossless approach—mainly for component testing—which delays the exploration of branches whose path conditions are independent of those already visited. It mimics the Partial Order Reduction (POR) algorithms used in model checkers. In particular embodiments, variety of optimizations may be employed in system 200, such as, for example and without limitation, expression rewriting, constraint set simplification, constraint independence, compact state representation, implied value concretization, counter-example cache and compact state representation.

It is inefficient to execute the bytecode of the implementation of a function call each time it is seen, especially considering that the same function may be invoked many times. In practice, functions may be related to each other; and in particular embodiments, the relationship between functions may be specified in a high level. The concrete implementation of these functions shall satisfy this relationship. This is particularly the case for C++ classes whose methods may be grouped together with respect to data member accesses.

For example, a C++ class usually provides a read method getvalue and a write method setvalue to access the (private) data members of the class. Their semantics satisfies rules (or theorems) obj.setvalue(i,v).getvalue(i)=v and obj.setvalue(i, v).setvalue(j,w).getvalue(i)=(if i=j then w else v). Particular embodiments may utilize these rules for the purpose of optimizing system 200. Particular embodiments may first build up these rule, and then use them during symbolic execution to avoid executing the bytecode implementation of these methods. This technique may be referred to as "Meta Execution", since the execution is in the mete-level, where the method names rather their definitions are manipulated. Of course, the sanity of these rules should be proved once and for all by, for example, symbolically executing the bytecode annotated with post-conditions.

Particular embodiments may extend the intermediate language (IL) used by system 200 to model an object and its methods directly. During symbolic execution, a symbolic expression may contain symbolic variables representing the objects and the names of the methods. A method call will not be expanded to its bytecode implementation.

To solve such an expression, particular embodiments may apply a set of rules to simplify the expression until no more simplification is possible. For example, with a Boolean expression, if the result is true or false, then a conclusive answer may be obtained. In particular embodiments, an independent variable, which is not related to others in the expression, can be instantiated to an arbitrary value. If there are not enough rules to simplify an expression, then particular embodiments may use the bytecode implementation of the involved methods or any specific solver to solve it.

In particular embodiments, the rules may be specified by the users, who have the sufficient and specific knowledge about the application under analysis, or derived automatically or semi-automatically from the source code and unit testing code. Typical unit testing code establishes the relation between methods.

For each rule derived, particular embodiments use symbolic execution to verify its correctness. Once it is proved correct, the rule maybe used anywhere during the meta execution without causing false alarms.

To further explain the concept of application-specific meta execution, consider an example database application, which uses methods insert, get, delete and count to access a database. An empty database object is denoted by $db_\epsilon$. The following sample code executes a sequence of database operations:

```
1    DB db;
2    db.insert(k1,v1);
3    db.insert(k2,v2);
4    db.delete(k1);
5    if (db.count( ) > 0 && db.get(k2) > v3)
6    ...
```

Sample Code for Database Operations

Right before the condition statement (the "if" statement at line 5), IL expression $db_\epsilon$.insert(k1,v1).insert(k2,v2).delete (k1) is built, which may be simplified to if k1=k2 then $db_\epsilon$ else $db_\epsilon$.insert(k2,v2). During symbolic execution, this branching expression may spawn two states: one with k1=k2 and an empty object, the other one with k1≠k2 and an object containing entry (k2,v2). For the first state, the condition is false. For the second state, expression $db_\epsilon$.insert(k2,v2).get(k2) is simplified to v2; then predicate v2>v3 will lead to two execution paths if v2 and v3 are symbolic variables.

The rules used in this example include the following. Note that the entries in the object are sorted according to their keys. If the keys have symbolic values, the entries in the database may overlap with each other over the keys. For example, the key of an incoming entry may or may not equal to that of an existing entry. In this case, the process may spawn two states: one for the equality case and one for the inequality case.

```
db.insert(k,v1).insert(k,v2) = db.insert(k,v2)
db.insert(k1,v1).insert(k2,v2) =
    db.insert(k2,v2).insert(k1,v1) if k2 < k1
db.insert(k,v).delete(k) = db
```

-continued

```
db.insert(k1,v1).delete(k2) =
    if k1 = k2 then db else db.delete(k2).insert(k1,v1)
db.count(db_ε) = 0
db.insert(k,v).count( ) = db.count( ) + 1
```

Sample Rules

In particular embodiments, each rule needs to be verified. For example, to verify the first rule, the following driver program with a post-condition may be implemented and executed in system 200 (e.g., by symbolic executor 224).

```
db.insert(k,v1);
DB old_db = db;
db.insert(k,v2);
assert(db == old_db);
```

Sample Driver for Verifying a Sample Rule

Figure 5:
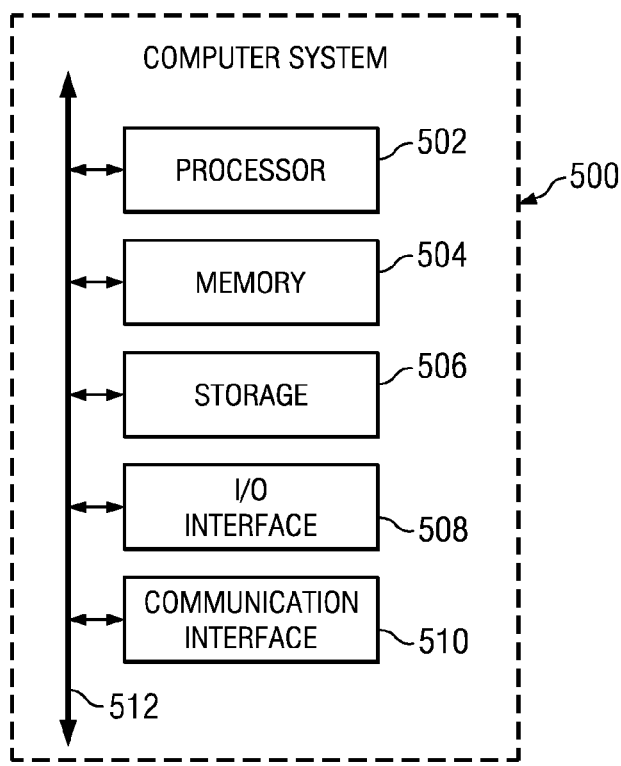
FIG. 5 illustrates an example network environment.

Particular embodiments may be implemented in a network environment. FIG. 5 illustrates an example network environment 500 suitable for providing software validation as a service. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. This disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. This disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. This disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
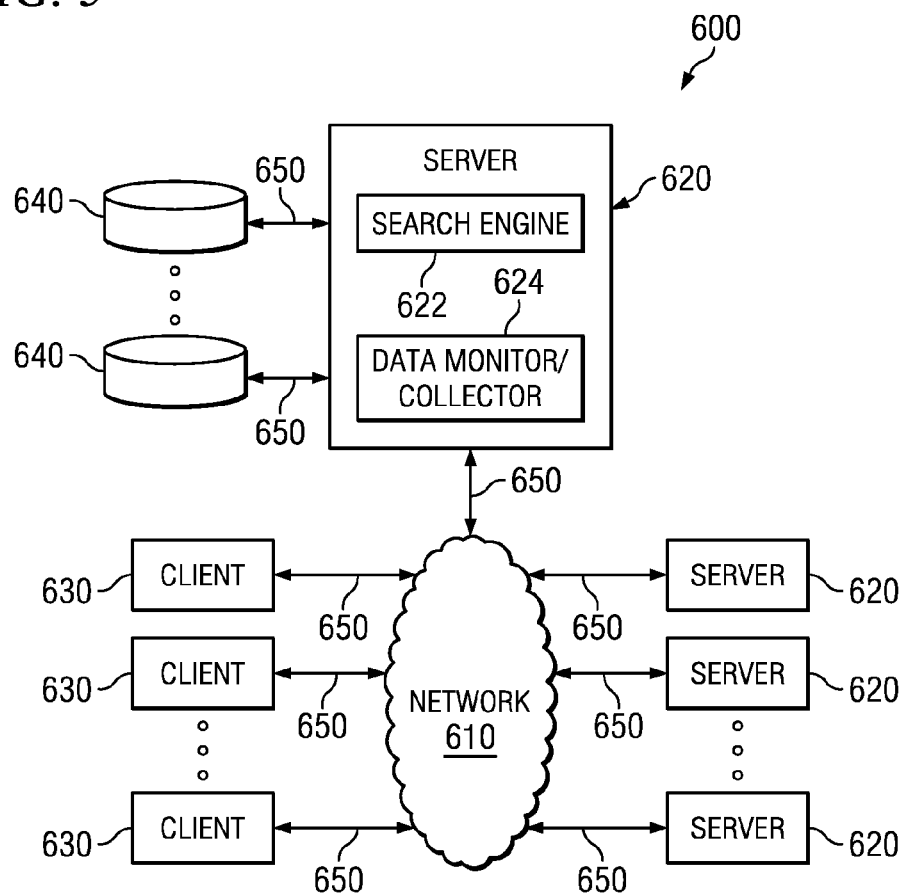
FIG. 6 illustrates an example computer system.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by one or more computing devices,
    compiling a C++ program having one or more input variables to obtain bytecode of the C++ program;
    modifying a standard C++ library associated with the C++ program to create an optimized C++ library, the optimized C++ library used for symbolic execution and the standard C++ library used for concrete execution, wherein modifying the standard C++ library comprises rewriting one or more classes defined in the standard C++ library to result in fewer execution paths;
    compiling the optimized C++ library to obtain bytecode of the optimized C++ library;
    symbolically executing the bytecode of the C++ program and the bytecode of the optimized C++ library, comprising:
        assigning a symbolic input to each input variable of the C++ program;
        determining one or more execution paths in the C++ program; and
        for each execution path, constructing a symbolic expression that if satisfied, causes the C++ program to proceed down the execution path;
    generating one or more test cases for the C++ program by solving each of the symbolic expressions, the one or more test cases indicating values that satisfy a feasible execution path of the C++ program with respect to the symbolic input; and
    testing the C++ program by compiling the C++ program to obtain machine code and applying the test cases as input to the machine code.

2. The method of claim 1, further comprising implementing one or more instructions to handle one or more bytecode instructions resulted from one or more features unique to C++ programming language.

3. The method of claim 1, further comprising:
    implementing a data structure to represent one or more exceptions supported by C++ programming language;
    constructing an exception table corresponding to the exceptions supported by C++ programming language; and
    interpreting the exceptions supported by C++ programming language according to their semantics.

4. The method of claim 1, further comprising serializing a plurality of C++ memory operations to guarantee a specific ordering of the C++ memory operations.

5. The method of claim 1, further comprising providing support to one or more floating point numbers.

6. The method of claim 1, wherein modifying the standard C++ library comprises modifying a source code of the standard C++ library to move one or more branching conditions outside of a loop to result in fewer execution paths.

7. A system comprising:
    a memory comprising instructions executable by one or more processors; and
    the one or more processors coupled to the memory and operable to execute the instructions, the one or more processors being operable when executing the instructions to:

compile a C++ program having one or more input variables to obtain bytecode of the C++ program;

modify a standard C++ library associated with the C++ program to create an optimized C++ library, the optimized C++ library used for symbolic execution and the standard C++ library used for concrete execution, wherein modifying the standard C++ library comprises rewriting one or more classes defined in the standard C++ library to result in fewer execution paths;

compile the optimized C++ library to obtain bytecode of the optimized C++ library;

symbolically executing the bytecode of the C++ program and the bytecode of the optimized C++ library, comprising:

assign a symbolic input to each input variable of the C++ program;

determine one or more execution paths in the C++ program; and for each execution path, construct a symbolic expression that if satisfied, causes the C++ program to proceed down the execution path;

generate one or more test cases for the C++ program by solving each of the symbolic expressions, the one or more test cases indicating values that satisfy a feasible execution path of the C++ program with respect to the symbolic input; and test the C++ program by compiling the C++ program to obtain machine code and applying the test cases as input to the machine code.

8. The system of claim 7, wherein the one or more processors are further operable when executing the instructions to implement one or more instructions to handle one or more bytecode instructions resulted from one or more features unique to C++ programming language.

9. The system of claim 7, wherein the one or more processors are further operable when executing the instructions to:

implement a data structure to represent one or more exceptions supported by C++ programming language;

construct an exception table corresponding to the exceptions supported by C++ programming language; and interpret the exceptions supported by C++ programming language according to their semantics.

10. The system of claim 7, wherein the one or more processors are further operable when executing the instructions to serialize a plurality of C++ memory operations to guarantee a specific ordering of the C++ memory operations.

11. The system of claim 7, wherein the one or more processors are further operable when executing the instructions to provide support to one or more floating point numbers.

12. The system of claim 7, wherein when modifying the standard C++ library the one or more processors are further operable to execute the instructions to modify a source code of the standard C++ library to move one or more branching conditions outside of a loop to result in fewer execution paths.

13. The system of claim 7, wherein when modifying the standard C++ library the one or more processors are further operable to execute the instructions to rewrite one or more classes defined in the standard C++ library to result in fewer execution paths.

14. One or more computer-readable non-transitory storage media embodying software operable when executed by one or more computer systems to:

compile a C++ program having one or more input variables to obtain bytecode of the C++ program;

modify a standard C++ library associated with the C++ program to create an optimized C++ library, the optimized C++ library used for symbolic execution and the standard C++ library used for concrete execution, wherein modifying the standard C++ library comprises rewriting one or more classes defined in the standard C++ library to result in fewer execution paths;

compile the optimized C++ library to obtain bytecode of the optimized C++ library;

symbolically execute the bytecode of the C++ program and the bytecode of the optimized C++ library, comprising:

assign a symbolic input to each input variable of the C++ program;

determine one or more execution paths in the C++ program; and for each execution path, construct a symbolic expression that if satisfied, causes the C++ program to proceed down the execution path;

generate one or more test cases for the C++ program by solving each of the symbolic expressions, the one or more test cases indicating values that satisfy a feasible execution path of the C++ program with respect to the symbolic input; and test the C++ program by compiling the C++ program to obtain machine code and applying the test cases as input to the machine code.

15. The media of claim 14, wherein the software is further operable when executed by one or more computer systems to test the C++ program using the test cases.

16. The media of claim 14, wherein the software is further operable when executed by one or more computer systems to implement one or more instructions to handle one or more bytecode instructions resulted from one or more features unique to C++ programming language.

17. The media of claim 14, wherein the software is further operable when executed by one or more computer systems to:

implement a data structure to represent one or more exceptions supported by C++ programming language;

construct an exception table corresponding to the exceptions supported by C++ programming language; and interpret the exceptions supported by C++ programming language according to their semantics.

18. The media of claim 14, wherein the software is further operable when executed by one or more computer systems to serialize a plurality of C++ memory operations to guarantee a specific ordering of the C++ memory operations.

19. The media of claim 14, wherein the software is further operable when executed by one or more computer systems to provide support to one or more floating point numbers.

20. The media of claim 14, wherein when modifying the standard C++ library the software is further operable when executed to rewrite one or more classes defined in the standard C++ library to result in fewer execution paths.

21. A system comprising means for compiling a C++ program having one or more input variables to obtain bytecode of the C++ program;

means for modifying a standard C++ library associated with the C++ program to create an optimized C++ library, the optimized C++ library used for symbolic execution and the standard C++ library used for concrete execution, wherein modifying the standard C++ library comprises rewriting one or more classes defined in the standard C++ library to result in fewer execution paths;

means for compiling the optimized C++ library to obtain bytecode of the optimized C++ library;

means for symbolically executing the bytecode of the C++ program and the bytecode of the optimized C++ library, comprising:

means for assigning a symbolic input to each input variable of the C++ program;

means for determining one or more execution paths in the C++ program; and for each execution path, means for constructing a symbolic expression that if satisfied, causes the C++ program to proceed down the execution path;

means for generating one or more test cases for the C++ program by solving each of the symbolic expressions, the one or more test cases indicating values that satisfy a feasible execution path of the C++ program with respect to the symbolic input; and means for testing the C++ program by compiling the C++ program to obtain machine code and applying the test cases as input to the machine code.

22. The system of claim 21, wherein means for modifying the standard C++ library comprises means for modifying a source code of the standard C++ library to move one or more branching conditions outside of a loop to result in fewer execution paths.

23. The system of claim 21, wherein means for modifying the standard C++ library comprises means for rewriting one or more classes defined in the standard C++ library to result in fewer execution paths.

* * * * *